United States Patent
Dant et al.

(10) Patent No.: US 7,451,931 B2
(45) Date of Patent: Nov. 18, 2008

(54) DETECTING BARCODES ON TWO-DIMENSIONAL IMAGES USING FREQUENCY DOMAIN DATA

(75) Inventors: Michael W. Dant, Cedar Rapids, IA (US); Robert A. Kohtz, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 260 days.

(21) Appl. No.: 11/389,691

(22) Filed: Mar. 27, 2006

(65) Prior Publication Data

US 2006/0213995 A1    Sep. 28, 2006

Related U.S. Application Data

(60) Provisional application No. 60/665,119, filed on Mar. 25, 2005.

(51) Int. Cl.
  *G06K 7/10* (2006.01)

(52) U.S. Cl. ............... 235/462.1; 235/462.01; 235/462.08; 235/462.25

(58) Field of Classification Search ........... 235/462.01, 235/462.08–462.11, 462.15, 462.25, 454, 235/494
See application file for complete search history.

(56) References Cited

U.S. PATENT DOCUMENTS

| 5,399,846 | A  | * | 3/1995  | Pavlidis et al. | ............ 235/462.1 |
| 6,814,291 | B1 | * | 11/2004 | Cordery et al.  | ........ 235/462.25 |
| 7,007,846 | B2 | * | 3/2006  | Shellhammer     | ............ 235/462.1 |

* cited by examiner

*Primary Examiner*—Seung H Lee
(74) *Attorney, Agent, or Firm*—Kinney & Lange, P.A.

(57) ABSTRACT

A system and method of detecting a barcode involves obtaining a two-dimensional source image and converting it into a frequency domain image (FDI). Frequency trends in the FDI are then analyzed to determine whether barcode information is present in the FDI. In this way, the presence, location, orientation, size and symbology of a barcode can be quickly and accurately determined.

19 Claims, 5 Drawing Sheets

DETECTING BARCODES ON TWO-DIMENSIONAL IMAGES USING FREQUENCY DOMAIN DATA

CROSS-REFERENCE TO RELATED APPLICATION(S)

This application claims the benefit of U.S. Provisional Application No. 60/665,119 filed Mar. 25, 2005 for "Detecting Barcodes on Two-Dimensional Images Using Two-Dimensional Frequency Domain Data" by M. Dant and R. Kohtz.

INCORPORATION BY REFERENCE

The aforementioned U.S. Provisional Application No. 60/665,119 is hereby incorporated by reference in its entirety.

BACKGROUND OF THE INVENTION

The present invention relates to location and decoding of barcode images using frequency domain data.

One of the greatest challenges to quickly decoding one-dimensional and two-dimensional barcodes on two-dimensional images is finding the barcode on the image and determining its symbology, location and orientation. Conventionally, this analysis is performed in the spatial domain of the image, where the value of a pixel is its brightness in the image, and the location of the pixel is determined with respect to other pixels that are spatially related to the pixel. A barcode is located by analyzing the values of the pixels to determine where a brightness pattern exists that corresponds to a barcode symbology.

While spatial analysis techniques provide the ability to detect and decode one-dimensional and two-dimensional barcodes, it would be useful to provide a different technique that could potentially reduce the amount of time required to detect and decode a barcode with a two-dimensional imager.

BRIEF SUMMARY OF THE INVENTION

The present invention is a system and method of detecting a barcode. A two-dimensional source image is obtained and converted into a frequency domain image (FDI). Frequency trends in the FDI are then analyzed to determine whether barcode information is present in the FDI. In this way, the presence, location, orientation, size and symbology of a barcode can be quickly and accurately determined.

DETAILED DESCRIPTION

Detection and location of one-dimensional and two-dimensional barcodes can potentially by done more quickly by performing frequency domain analysis rather than spatial domain analysis of the images. Frequency domain images indicate the transition rate of a given row or column of pixels. Both one-dimensional and two-dimensional barcodes are collections of pixel transitions, which makes a frequency domain image of the original image useful to analyze whether a barcode exists to determine and its location, orientation, symbology and size.

Frequency domain images (FDIs) are created by performing discrete Fourier transforms on the row and column information of a two-dimensional source image. An FDI is two-dimensional data, created from the two-dimensional source image using discrete Fourier transforms, that detects pixel transition frequencies. These FDIs represent the magnitude and frequency of pixel transitions in the source image, so that the patterns of pixel transitions that correspond to barcodes can be identified. As barcode information consists solely of pixel transitions, FDIs are an efficient and quick methodology for determining barcode information.

Figure 1:
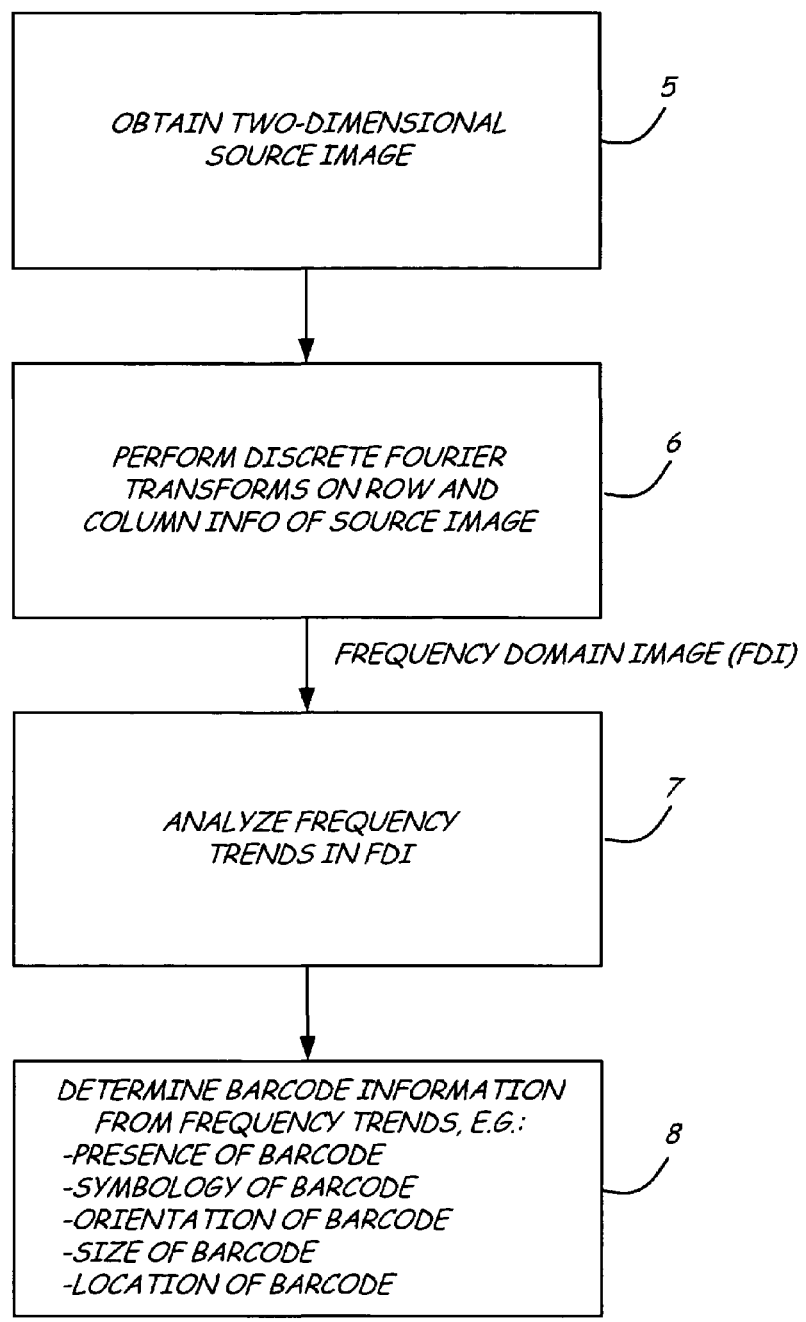
FIG. 1 is a flow diagram illustrating the process of obtaining and analyzing a frequency domain image (FDI) in order to determine barcode information.

FIG. 1 is a flow diagram illustrating an exemplary process of obtaining and analyzing a frequency domain image (FDI) in order to determine barcode information. A two-dimensional source image is obtained at step 5. This image maybe obtained in a number of ways, all of which are well known in the art, such as by laser scanning, scanning with a charge coupled device (CCD) or a complementary metal oxide semiconductor (CMOS) sensor, or others. Discrete Fourier transforms are then performed on the row and column information of the two-dimensional source image at step 6. The discrete Fourier transforms are performed in order to convert the spatial two-dimensional source image into a frequency domain image (FDI). Next, frequency trends in the FDI are analyzed at step 7, and barcode information is then determined based on the analyzed frequency trends, as indicated by step 8.

FDI data can be perceived by humans as an image, or can be processed by a computer in order to analyze the source image. The FDI data is analyzed at step 7 to detect frequency trends, which are clusters of high magnitude frequencies that form a shape in the FDI that indicates the presence and location of a barcode. These shapes may be manifested as long, skinny fingers or short, squat protuberances, for example, depending on the symbology of the barcode that is detected. If an FDI contains only small magnitudes of frequencies or contains a wide dispersal of frequencies with no frequency trends, it can be inferred that no barcodes exist and the image can be ignored. The analysis of whether barcode information has been detected, and of identifying the symbology of any barcode information that is detected, is performed in step 8.

The following information is representative of the type of information that can be detected by an FDI at step 8 of FIG. 1:

1. Presence of a barcode—as discussed above, barcodes are a series of pixel transitions, and therefore appear as high magnitude frequencies in an FDI.

2. Symbology of a barcode—FDIs represent horizontal frequencies on their X axis and vertical frequencies on their Y axis. If a frequency trend is found that is relatively narrow, it can be inferred that the barcode is a one-dimensional symbology. Two-dimensional barcodes appear as a thicker frequency trend in the FDI, because both horizontal (X axis) and vertical (Y axis) frequencies have high magnitudes.

3. Orientation of a barcode—both one-dimensional and two-dimensional barcodes have their highest magnitude frequency trends in the direction of their orientations. A barcode that is horizontal on the source image will show many more horizontal frequencies than vertical frequencies or frequencies of any other angle. Vertically oriented barcodes will show frequency trends that are vertical. In general, for any given barcode orientation, the FDI frequency trend will have the same orientation.

4. Size of a barcode—the frequency of pixel transitions is greater for barcodes that are relatively small with respect to the rest of the image, and is smaller for barcodes that are relatively large with respect to the rest of the image. This information can be used to estimate the size of the barcode, and to infer whether sufficient information is present to decode the barcode at a given resolution.

5. Location of a barcode—once a frequency trend is identified that represents a barcode, a reverse Fourier transform can be performed to determine the position of the barcode in the original image.

Figure 2:
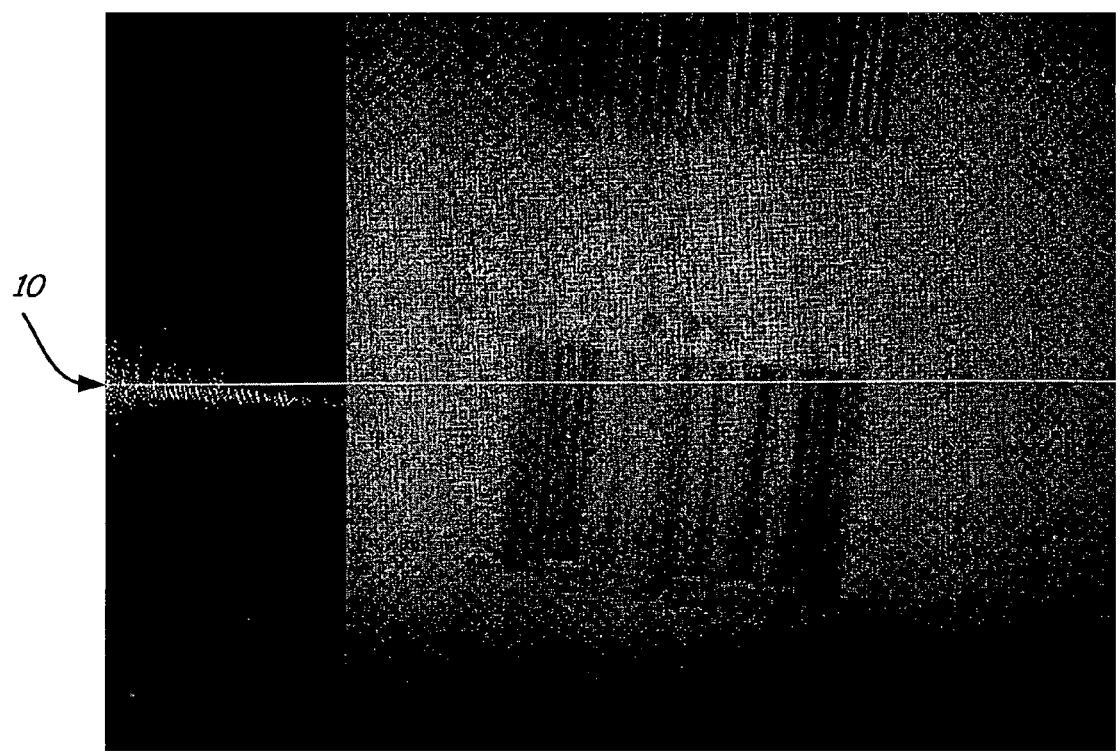
FIG. 2 is a diagram illustrating an FDI superimposed over a one-dimensional barcode image from which the FDI was obtained.

FIG. 2 is a graph illustrating FDI 10 superimposed over a one-dimensional barcode image from which the FDI 10 was obtained. In this graph, pixels on the horizontal scale (from left to right) represent frequencies that were detected on the horizontal axis of the spatial image, and pixels on the vertical scale (up and down from the center) represent frequencies that were detected on the vertical axis of the spatial image. The graph of FDI 10 shows that high frequency trends are occurring in a single primary direction (nearly horizontal), which indicates that the barcode is one-dimensional. The slope of the shape pattern of the FDI graph corresponds to the slight tilt angle of the barcode in the spatial image.

Figure 3:
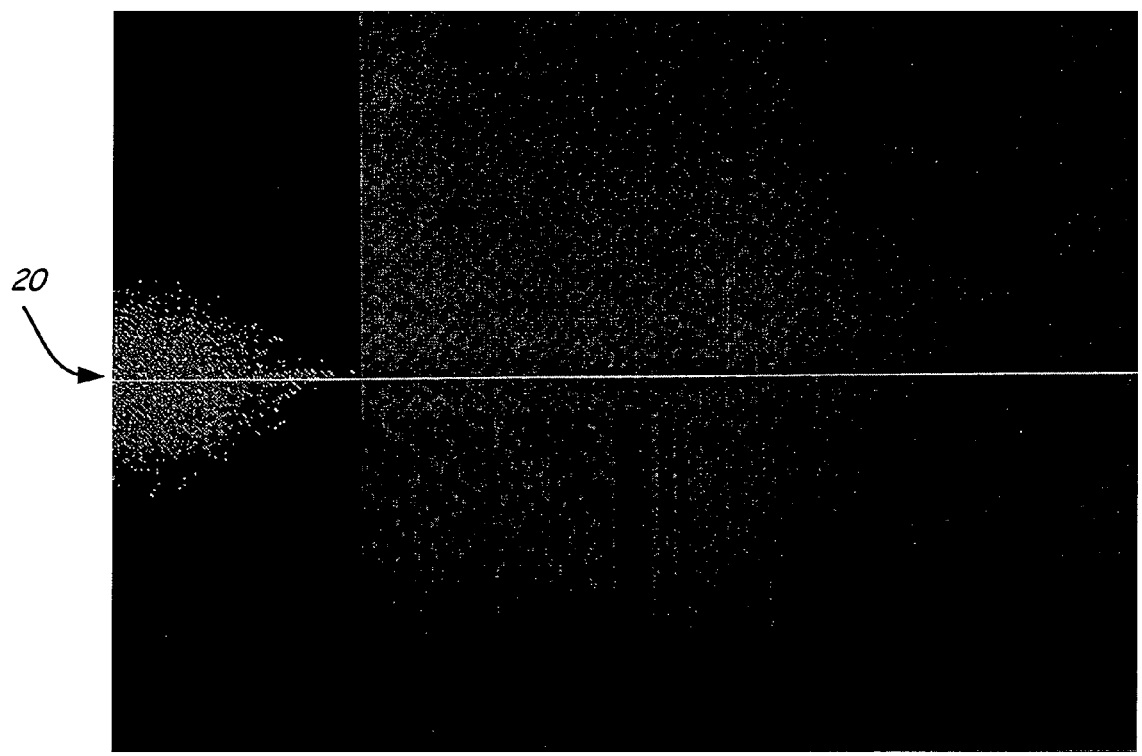
FIG. 3 is a diagram illustrating an FDI superimposed over a two-dimensional barcode image from which the FDI was obtained.

FIG. 3 is a graph illustrating FDI 20 superimposed over a two-dimensional barcode image from which FDI 20 was obtained. This graph shows that high frequency trends are occurring on both the horizontal and vertical axes, resulting in a shape pattern that looks more two-dimensional. This indicates the presence of a two-dimensional barcode in the spatial image.

Figure 4:
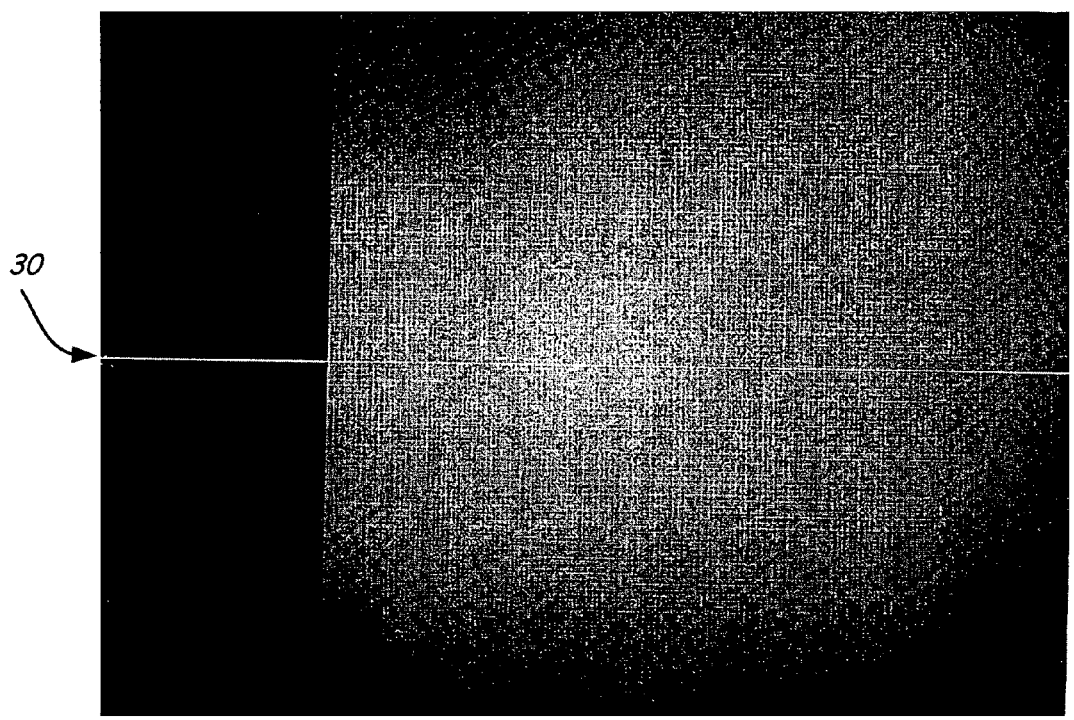
FIG. 4 is a diagram illustrating an FDI superimposed over an image having no barcodes from which the FDI was obtained.

FIG. 4 is a diagram illustrating FDI 30 superimposed over an image having no barcodes from which FDI 30 was obtained. FDI 30 does not have any high magnitude frequency trends, either vertically or horizontally, due to the fact that there are no pixel transitions present in the image. Because FDI 30 has no high magnitude frequency trends, it can be inferred that no barcode is present in the image.

Figure 5:
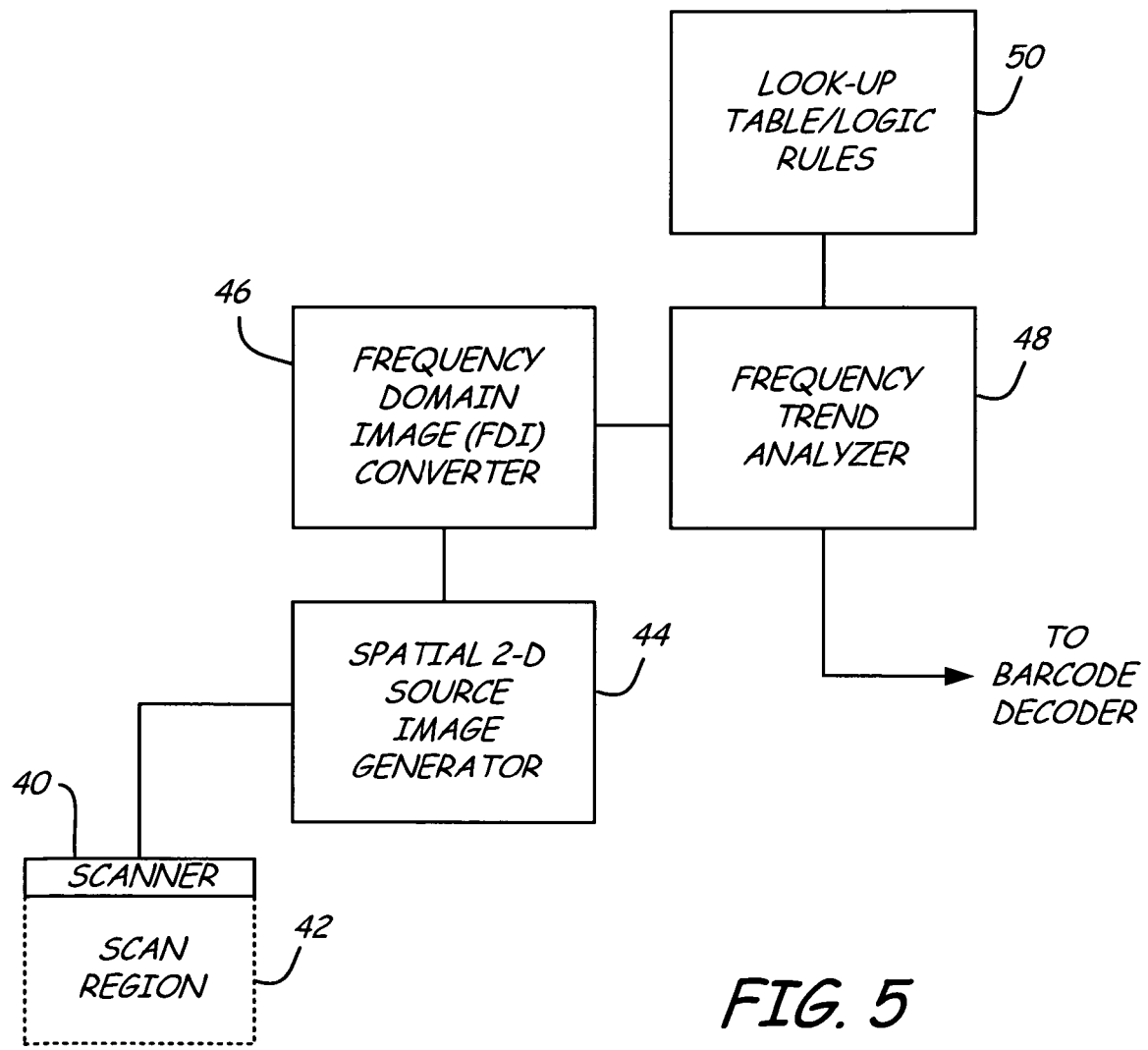
FIG. 5 is a block diagram illustrating exemplary components of a system for detecting a barcode according to an embodiment of the present invention.

FIG. 5 is a block diagram illustrating exemplary components of a system for detecting a barcode according to an embodiment of the present invention. Scanner 40, which maybe a laser scanner, a charge-coupled device (CCD) or complementary metal oxide semiconductor (CMOS) imager, or another type of image-obtaining device known in the art, operates with image generator 44 to obtain a spatial two-dimensional source image from an object located in scan region 42. The spatial two-dimensional source image is then converted into an FDI by FDI converter 46. Frequency trends in the FDI are analyzed by frequency trend analyzer 48 to determine whether barcode information is present in the FDI. This analysis maybe made by comparing frequency trends in the FDI to stored data in memory 50, by analyzing frequency trends according to logic rules stored in memory 50, or by other means. Information related to the determination of the presence, location, orientation, size and/or symbology of a barcode is then passed by frequency trend analyzer 48 to a barcode decoder in order to allow the information represented by the barcode to be decoded.

In the discussion of FIG. 5 above, it should be noted that the functional blocks depicted may be realized by hardware, software, or a combination of the two, as is generally known in the art.

The present invention introduces a new method for locating barcodes and identifying barcode symbology, involving frequency domain analysis of a source image. A frequency domain image (FDI) is created by performing discrete Fourier transforms on the row and column information of the source image, and is used to detect pixel transition frequencies. The presence, symbology, and other characteristics of a barcode are determined by analyzing frequency trends in the FDI.

Although the present invention has been described with reference to preferred embodiments, workers skilled in the art will recognize that changes maybe made in form and detail without departing from the spirit and scope of the invention.

The invention claimed is:

1. A method of detecting a barcode comprising:
   obtaining a two-dimensional source image;
   converting the two-dimensional source image into a frequency domain image (FDI); and
   analyzing frequency trends in the FDI to determine whether barcode information is present in the FDI by determining whether clusters of high magnitude frequencies that indicate the presence of a barcode are present in the FDI.

2. The method of claim 1, wherein obtaining the two-dimensional source image is performed by laser scanning.

3. The method of claim 1, wherein obtaining the two-dimensional source image is performed by a charge coupled device (CCD) imager.

4. The method of claim 1, wherein obtaining the two-dimensional source image is performed by a complementary metal oxide semiconductor (CMOS) imager.

5. The method of claim 1, wherein converting the two-dimensional source image into the FDI comprises performing discrete Fourier transforms on row and column information of the two-dimensional source image to detect pixel transition frequencies.

6. The method of claim 1, wherein analyzing frequency trends in the FDI to determine whether barcode information is present in the FDI comprises:
   analyzing a shape of a cluster of high magnitude frequencies to determine the symbology of a barcode that is determined to be present in the FDI.

7. The method of claim 1, wherein analyzing frequency trends in the FDI to determine whether barcode information is present in the FDI comprises:
   analyzing an orientation of a cluster of high magnitude frequencies to determine the orientation of a barcode that is determined to be present in the FDI.

8. The method of claim 1, wherein analyzing frequency trends in the FDI to determine whether barcode information is present in the FDI comprises:
   analyzing the frequency of pixel transitions in the FDI to determine a size of a barcode that is determined to be present in the FDI.

9. The method of claim 1, wherein analyzing frequency trends in the FDI to determine whether barcode information is present in the FDI comprises:
   analyzing the frequency of pixel transitions in the FDI to determine whether sufficient information is present in the FDI to decode the barcode at a particular level of resolution.

10. The method of claim 1, wherein analyzing frequency trends in the FDI to determine whether barcode information is present in the FDI comprises:

performing a reverse Fourier transform on the FDI to determine a position of the barcode in the two-dimensional source image.

11. A method of detecting a barcode comprising:

obtaining a two-dimensional source image;

performing discrete Fourier transforms on row and column information of the two-dimensional source image to convert the two-dimensional source image into a frequency domain image (FDI);

analyzing frequency trends in the FDI to detect clusters of high magnitude frequencies that form a shape in the FDI that indicates at least one of presence, location, symbology, orientation and size of a barcode.

12. The method of claim 11, wherein obtaining the two-dimensional source image is performed by laser scanning.

13. The method of claim 11, wherein obtaining the two-dimensional source image is performed by a charge coupled device (CCD) imager.

14. The method of claim 11, wherein obtaining the two-dimensional source image is performed by a complementary metal oxide semiconductor (CMOS) imager.

15. The method of claim 11, wherein performing discrete Fourier transforms on row and column information of the two-dimensional source image to convert the two-dimensional source image into the FDI comprises detecting pixel transition frequencies.

16. The method of claim 11, wherein analyzing frequency trends in the FDI comprises:

performing a reverse Fourier transform on the FDI to determine a position of the barcode in the two-dimensional source image.

17. A system for detecting a barcode comprising:

a scanner and image generator for obtaining a two-dimensional source image from an object in a scan region of the scanner;

a frequency domain image (FDI) converter for converting the two-dimensional source image into an FDI; and a frequency trend analyzer for analyzing frequency trends in the FDI to determine whether barcode information is present in the FDI by detecting clusters of high magnitude frequencies that form a shape in the FDI that indicates at least one of presence, location, symbology, orientation and size of a barcode.

18. The system of claim 17, wherein the frequency trend analyzer compares frequency trends in the FDI to stored data to determine whether barcode information is present in the FDI.

19. The system of claim 17, wherein the frequency trend analyzer analyzes frequency trends in the FDI according to stored logic rules to determine whether barcode information is present in the FDI.

* * * * *